US011214003B2

United States Patent
Duffner et al.

(10) Patent No.: US 11,214,003 B2
(45) Date of Patent: Jan. 4, 2022

(54) DEVICE AND METHOD FOR PRODUCING A THREE-DIMENSIONAL OBJECT WITH A FIBRE FEEDING DEVICE

(71) Applicant: ARBURG GMBH + CO KG, Loßburg (DE)

(72) Inventors: Eberhard Duffner, Starzach (DE); Florian Baumann, Wildberg (DE)

(73) Assignee: ARBURG GMBH + CO KG, Lossburg (DK)

( * ) Notice: Subject to any disclaimer, the term of this patent is extended or adjusted under 35 U.S.C. 154(b) by 342 days.

(21) Appl. No.: 16/062,311

(22) PCT Filed: Dec. 20, 2016

(86) PCT No.: PCT/EP2016/081877
§ 371 (c)(1),
(2) Date: Jun. 14, 2018

(87) PCT Pub. No.: WO2017/108758
PCT Pub. Date: Jun. 29, 2017

(65) Prior Publication Data
US 2018/0370130 A1 Dec. 27, 2018

(30) Foreign Application Priority Data
Dec. 22, 2015 (DE) ...................... 10 2015 122 647.2

(51) Int. Cl.
*B29C 64/209* (2017.01)
*B29C 64/321* (2017.01)
(Continued)

(52) U.S. Cl.
CPC .......... *B29C 64/209* (2017.08); *B29C 64/118* (2017.08); *B29C 64/165* (2017.08);
(Continued)

(58) Field of Classification Search
CPC ............................ B29C 64/209; B29C 70/382
See application file for complete search history.

(56) References Cited

U.S. PATENT DOCUMENTS

| 5,936,861 A | 8/1999 | Jang |
| 6,153,034 A | 11/2000 | Lipsker |

(Continued)

FOREIGN PATENT DOCUMENTS

| CA | 2204792 | 5/1997 |
| DE | 19681773 B4 | 10/2007 |

(Continued)

OTHER PUBLICATIONS

International Search Report for corresponding application PCT/EP2016/081877 filed Dec. 20, 2016; dated Apr. 6, 2017.

*Primary Examiner* — Francisco W Tschen
*Assistant Examiner* — Elisa H Vera
(74) *Attorney, Agent, or Firm* — Cantor Colburn LLP

(57) ABSTRACT

A device and a method for producing a three-dimensional object from at least one fluid-phase, fusable material has at least one discharge unit (12) with at least one outlet opening for the generative discharge of the fusable material for building up the object (50). By means of at least one fibre feeding device (60), at least one fibre element (61) is supplied for embedding the fibre element in the fusable material discharged from the discharge unit (12), wherein the fibre feeding device (60) is movable for the alignment of the fibre element in relation to an advancement in the building of the object. The fact that the fibre feeding device (60) is mounted on the discharge unit (12) and is movable in relation to the discharge unit (12) means that a selective introduction of fibre elements is made available for the production of a three-dimensional object with improved material properties by the generative process.

17 Claims, 8 Drawing Sheets

(51) Int. Cl.
  *B29C 70/38*    (2006.01)
  *B29C 64/118*   (2017.01)
  *B29C 64/165*   (2017.01)
  *B33Y 30/00*    (2015.01)
  *B33Y 10/00*    (2015.01)

(52) U.S. Cl.
  CPC ............ *B29C 64/321* (2017.08); *B29C 70/38* (2013.01); *B29C 70/382* (2013.01); *B33Y 10/00* (2014.12); *B33Y 30/00* (2014.12)

(56) References Cited

U.S. PATENT DOCUMENTS

| | | | |
|---|---|---|---|
| 2002/0062909 A1 | 5/2002 | Jang | |
| 2012/0159785 A1 | 6/2012 | Pyles | |
| 2014/0328963 A1 | 11/2014 | Mark | |
| 2015/0224699 A1* | 8/2015 | Larsen | B29C 64/118 264/176.1 |
| 2015/0314531 A1* | 11/2015 | Mark | B29C 64/118 264/241 |
| 2016/0271876 A1* | 9/2016 | Lower | B29C 64/386 |
| 2017/0106594 A1* | 4/2017 | Gardiner | B29C 64/118 |
| 2017/0210074 A1* | 7/2017 | Ueda | B33Y 10/00 |

FOREIGN PATENT DOCUMENTS

| | | |
|---|---|---|
| DE | 102011109369 A1 | 2/2013 |
| EP | 1886793 A1 | 2/2008 |
| EP | 2266782 B1 | 3/2012 |
| WO | 2013017284 A2 | 2/2013 |
| WO | 2014193505 A1 | 12/2014 |
| WO | 2015073992 A1 | 5/2015 |

\* cited by examiner

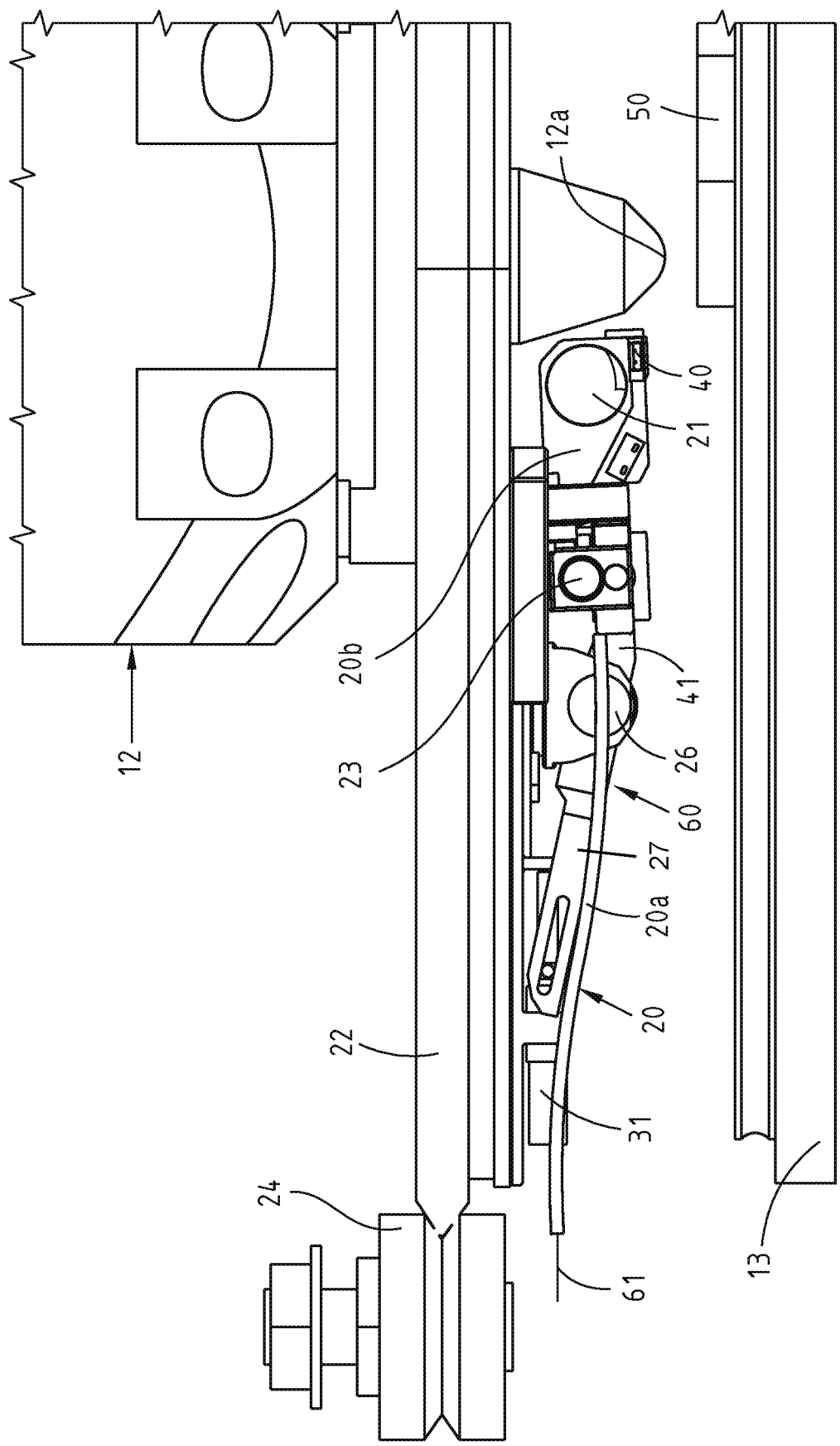

DEVICE AND METHOD FOR PRODUCING A THREE-DIMENSIONAL OBJECT WITH A FIBRE FEEDING DEVICE

REFERENCE TO RELATED APPLICATIONS

The present application is the U.S. national phase of International Patent Application Number PCT/EP2016/081877 filed on Dec. 20, 2016 which is related to and claims the priority of German patent application 10 2015 122 647.2, filed on 22 Dec. 2015, the disclosure of which is hereby expressly incorporated by reference into the subject matter of the present application.

TECHNICAL FIELD

The disclosure relates to a device and a method for producing a three-dimensional article made from at least one solidifiable material, comprising a fiber feed device.

BACKGROUND

A device of this kind is known from WO 2015/073992 A1, which shows a device for individually manufacturing three-dimensional structures comprising fiber-reinforced elements. For this purpose a discharge unit for discharging a solidifiable material and a fiber feed device spaced apart to and relatively movable to the discharge unit are provided, which fiber feed device is mounted on the discharge unit. A "manipulation tip" moves together with the fiber either laterally or in vertical z-direction.

In DE 10 2011 109 369 A1 a plasticizing unit, that is known from injection molding technology and that mixes, homogenizes and prepares the material in a manner conventional in injection molding technology, is coupled to a pressurizable material reservoir for the fluid phase of the solidifiable material. For the purpose of producing an article on an object support, this material is discharged through a discharge opening, typically in the form of drops but also as a strand. Because of the adhesion strengths of the material, which may as standard be a material likewise conventional in injection molding technology and need not be a specific material for prototype production, for the desired small drop size of 0.01 to 0.05 $mm^3$ a high pressure in the range of more than 10 to 100 MPa and high melt temperatures are required. In contrast to a method using powder, the adhesion strengths give the drops adhesive power. Nonetheless, and depending on the object, this adhesive power may be insufficient, with the result that fiber-reinforced structures are already proposed in that document. In this case, a fiber is fed to the solidifiable material, at a spacing from the outlet for the solidifiable material, by way of a fiber feed device that where required has a 5-axis geometry, and is embedded in the material as appropriate. Where applicable, the fiber element is fed in a differing orientation, for the purpose of constructing a three-dimensional structure. For the purpose of orienting the fiber element in relation to the progress of constructing the article, the fiber feed device is arranged such that it is movable separately from the discharge unit.

CA 2 204 792 A1 discloses feeding a fiber element for embedding in a solidifiable material that is applied separately therefrom, in order in this way to produce a fiber-reinforced article. The main point here is the introduction of glass fibers in the manner of a fabric.

U.S. Pat. No. 5,936,861 A discloses adding to an article a previously impregnated fiber element together with a solidifiable material. The solidifiable material is fed around the fiber element at the same time as the fiber element is output. In principle, the solidifiable material may also be discharged separately through a further discharge unit, in which case an impregnated fiber element is deposited and is embedded in the material subsequently.

US 2014/0328963 A1 discloses, for the purpose of three-dimensional printing and for producing fiber-reinforced objects, feeding fibers through the outlet of the material used for printing. This makes movement relative to the discharge unit impossible.

US 2002/0062909 A1 discloses a fiber feed device for producing three-dimensional articles in layers, wherein fibers are fed separately from the feeding of material. The fiber feed device is arranged on the discharge unit and is movable in relation to the progress of constructing the article but not mounted on the discharge unit. (The same applies to WO 2014/193505 A1, U.S. Pat. No. 6,153,034 A, DE 196 81 773 B4, US 2012/0159785 A1.)

It is known, in the production of plastics parts, to produce parts in large batch sizes and runs using molds, by injection molding or extrusion. The advantage of the injection molding of plastics lies in particular in the highly precise production of complex part geometries, wherein the versatility of the functions of the injection molding method meets the demands for low-cost and economic production of plastics parts in optimum manner. The material is plasticized, homogenized and prepared for the injection procedure by way of a plasticizing unit.

At the same time, there is a need for plastics parts in a run size of 1 and in small batches, such as sample parts, with the requirement for very rapid provision and properties similar to those of injection molded parts. For producing such parts, there are manufacturing methods that are widely known by the term "prototyping and rapid manufacturing". Such parts are produced without molds, in most cases based on the generation of the geometry from 3D data. These geometries undergo additive manufacture in the most diverse forms by appropriate processes, such as the application of melted powder layers by the introduction of heat using lasers, or the local crosslinking and curing of resins, or indeed by the so-called melt strand method.

In practice, it has been found that when three-dimensional parts such as rapid prototyping parts are produced from solidifiable material, such as conventional thermoplastic material, workpiece properties that cannot readily be achieved from the base materials per se are frequently also desired. Short-fiber plastics are not capable of achieving material properties of this kind. Although fiber-reinforced materials may provide a remedy, when drops in particular are output the processable fiber length and the reinforcing action thereof would be inadequate.

BRIEF SUMMARY

Taking this prior art as a starting point, the disclosure provides a targeted introduction of fiber elements for producing a three-dimensional article having improved material properties by the additive method.

This is achieved in that there is mounted on the discharge opening of the discharge unit a fiber feed device that allows the fiber element to be oriented in relation to the discharge unit. This allows the fiber element to be brought into the deposit position on the article or on the object support in a targeted manner oriented in relation to the direction of construction, in order to achieve the desired material properties in an optimum manner, independently of the preparation of the material. Furthermore, the fiber feed device is mounted rotationally movably on the discharge unit by way of a bearing element and is rotatable by means of a drive unit such that the fiber element may be oriented in relation to the direction of construction and the discharge unit.

Preferably, the bearing element is formed by a ring that has a toothing, which is in operative connection with an output gear of the drive unit. An arrangement of this kind allows a space-saving arrangement on the discharge unit.

For this purpose, an adjustment device is preferably provided that is concentric with the outlet of the discharge unit, with the result that any desired orientation is achievable without difficulty. The fiber feed device is thus fixed to the discharge unit but rotatable thereon, where applicable being rotatable about itself even by more than 360° or indeed a multiple thereof. This rotational movement, like the fiber feed, serves to orient the fiber in relation to the material discharge and may be synchronized with the strategy for construction of the object on the construction platform.

Preferably, a positive guidance arrangement is provided for the fiber element, at the end whereof there is arranged a cutting device. As a result, the fiber element may be brought into the deposit position on the article or on the object support in targeted manner and then be cut as required.

The positive guidance arrangement of the fiber feed device is mounted on the discharge unit in articulated manner and is movable by means of a further drive unit in order in particular to enable an end head to be positioned if required. At the start for example the end head may press the fiber against the substrate, that is to say the object support or the already partly produced article, and if required bond it thereto by means of a preferably provided heating element. From there, the fiber element may be put under tension for example in order then to be embedded in the material.

The positive guidance arrangement is formed by a tubular element, for example a thin capillary tube, so that the fiber element, which lacks rigidity, may be deposited precisely at its intended location. The fiber element may then be conveyed in the tubular element, preferably by means of air or a micro-feed, until it is brought to the construction point or deposit position for the fiber element.

According to the method, the solidifiable material is discharged from a discharge unit for the purpose of additive manufacture of the article and at least one fiber element is fed for the purpose of being embedded in the discharged solidifiable material, wherein the fiber feed device that is mounted on the discharge unit is moved in relation to the progress of constructing the article, for the purpose of orienting the fiber element. At the same time, the fiber element may be moved in relation to the discharge unit. This is accomplished in that the fiber feed device is rotated at the discharge unit by means of a driving unit for orienting the fiber element such that optimum feeding of the fiber element may be achieved in targeted manner in order to obtain the desired material properties.

Preferably, the accompanying rotation of the fiber element takes place concentrically with the discharge opening of the discharge unit. As a result, the fiber element may be positioned without hindrance.

Where required, the fiber element may be moved in the direction towards and away from the object support and/or pressed against the article to be produced by means of a further drive unit.

Further advantages are apparent from the subclaims and the description given below of a preferred exemplary embodiment.

BRIEF DESCRIPTION OF THE FIGURES

The disclosure is explained in more detail below with reference to a preferred exemplary embodiment. In the Figures:

FIG. 7 shows a detail on a larger scale of the discharge unit in the region of the fiber feed device.

DETAILED DESCRIPTION OF PREFERRED EXEMPLARY EMBODIMENTS

The disclosure is now explained in more detail by way of example, with reference to the attached drawings. However, the exemplary embodiments are only examples, which are not intended to restrict the inventive concept to a particular arrangement. Before the disclosure is described in detail it should be pointed out that it is not restricted to the respective constituent parts of the device and the respective method steps, since these constituent parts and method steps may vary. The terms used here are merely intended to describe particular embodiments and are not used restrictively. Moreover, where the singular or the indefinite article is used in the description or the claims, this also refers to a plurality of these elements unless the overall context unambiguously indicates otherwise.

Figure 9D:
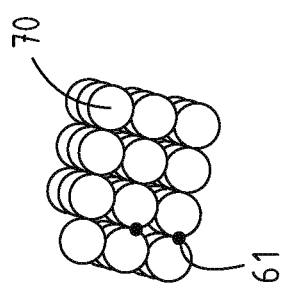
FIGS. 9a-9f show schematic illustrations of different geometries for embedding fiber elements.
Figure 9C:
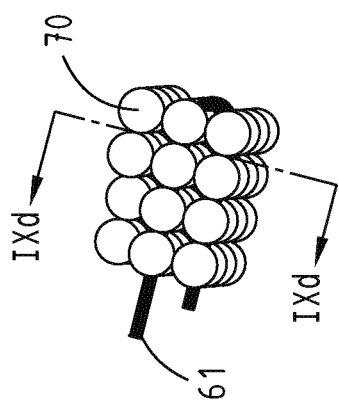
Figure 9B:
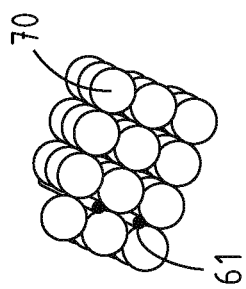
Figure 9F:
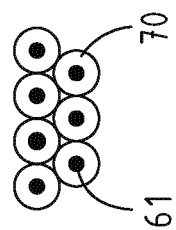
Figure 9A:
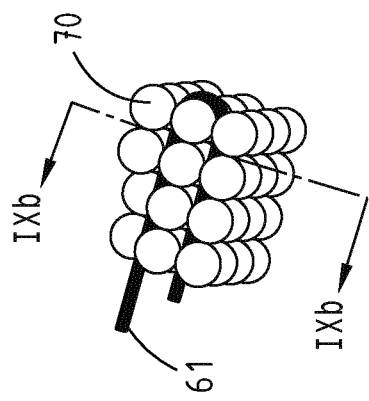
Figure 9E:
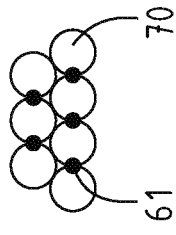

The Figures show a device for producing a three-dimensional article 50 from at least one fluid-phase solidifiable material, which is either in a fluid phase in the initial condition or may be liquefied. The solidifiable material may be discharged sequentially, in the form of discontinuous drops 70 (FIG. 9a), from an discharge opening 12a of at least one pulsable discharge unit 12 that is closable by means of a closure element 14. A closure element that is usable for this purpose is known from EP 2 266 782 B1. It is likewise possible for the solidifiable material to be discharged as a strand from a discharge unit. Combinations of both discharge methods are conceivable for the purpose of constructing the component more rapidly, in particular if a plurality of discharge units are used. It is also conceivable, if a plurality of discharge units 12 are used, to discharge a strand through one discharge unit and to discharge drops through another discharge unit. In principle, therefore, a plurality of discharge units with one or more discharge heads may also be used.

Figure 8A:
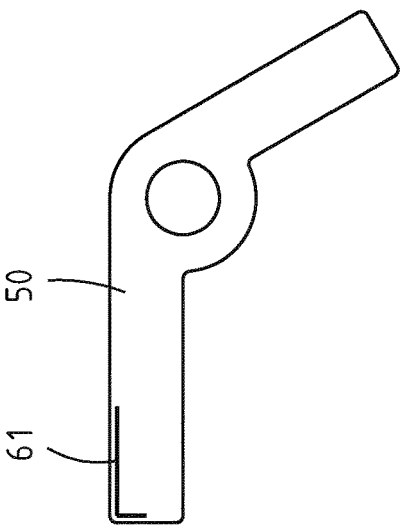
FIGS. 8a-8c show a plan view of the production of an article reinforced by a fiber element.
Figure 8B:
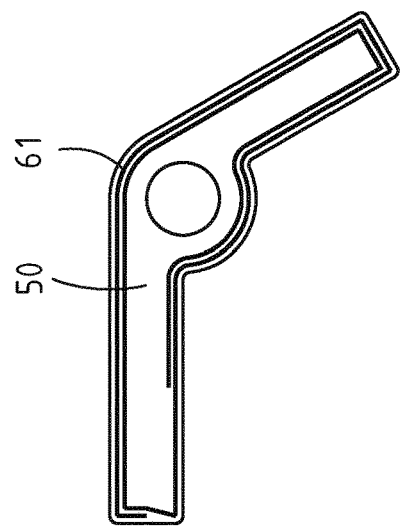
Figure 8C:
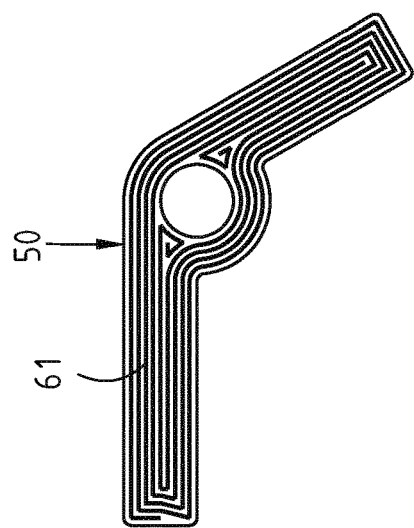

As a result of the discharge of the solidifiable material, additive manufacture of the article 50, as illustrated for example in FIGS. 8a to 8c, is performed. It can clearly be seen how a fiber element 61 is embedded here during construction of the article 50, as it progresses from FIG. 8a to FIG. 8b. The term "additive manufacture" is understood to mean gradual construction of an article, generating the component for example drop by drop and/or layer by layer. The discharge unit 12 is illustrated only schematically in the Figures. Its construction is known from EP 1 886 793 A1 and is incorporated herein by reference to that specification. In detail, that specification discloses the construction of a three-dimensional article 50 by the sequential discharge of drops or strands from the discharge unit 12. The article 50 is thus created by the drops 70 layer by layer on an object support 13. The discharge unit 12 is connected to a material reservoir 18, to which material that is prepared by a preparation unit is fed under pressure by way of a pressure generation unit. The drops 70 and/or strands are conveyed through the pulsable discharge opening 12a into a construction space in which the article 50 is constructed on the object support 13. Preferably, the discharge unit 12 is part of a plasticizing unit that is known in principle from injection molding technology and at the same time also includes the pressurizable material reservoir 18 for introducing the fluid phase. As in injection molding technology, a plasticizing unit of this kind prepares, homogenizes and mixes the material. The pressure on the fluid phase in the material reservoir generates the drop 70 or strand in a directly coupled manner.

Since it is significant for use of the device and also for the method, the property of the material is now discussed. The fluid-phase solidifiable material is a plasticized material such as silicone or a plasticizable material such as plastics or indeed powder materials, wherein the main point is that the material is convertible to a fluid phase. The material may also be a material that is reversibly meltable under heat and hence recyclable. Any other desired materials may be used provided these materials are plasticizable by the device and above all dischargeable through the at least one discharge unit 12. Possible solidifiable materials that are fiber-reinforced if required are all materials such as resins, thermoplastics, silicones and other supporting materials that enable additive manufacture in layers. Since a plasticizing unit that is known from injection molding technology is preferably used for preparing, homogenizing and mixing the solidifiable material as a plasticized or plasticizable material, a material that is available as standard or is provided in the case of injection molding may be used to produce the parts. Thus, there is no need for a specific, special material.

The fluid-phase solidifiable material has a so-called laminar source flow. The deposition of the melt against the wall, among other things, takes place in the laminar flow. This becomes clearest on considering what is learned from injection molding technology. When the mound of a simple rectangular channel is filled, the melt is injected by way of a so-called gate and begins to spread out from this point in a circle with continuous flow fronts until it occupies the entire width of the cavity. Sometime thereafter, the region between the inlet and the flow front may be regarded as more or less formed. At the flow front itself, there prevails a particular flow situation, the "laminar source flow", since the flow lines in this region appear as a source when considered in relation to a coordinate system moving with it.

On the one hand, the laminar source flow is advantageous to the generation of drops that are "aligned" with a construction space, because of its laminar form; on the other hand, and particularly when forming small drops, it is precisely here that the problems that make it difficult to implement with apparatus and materials known from injection molding technology arise. Adhesion to the wall has the result that the masses can only with difficulty be made into drops having the desired small volumes, preferably in the range of less than or equal to 1 $mm^3$, and the desired flow rate; on the other hand, a correspondingly high viscosity of the material is specifically significant for the formation of a suitable drop shape and for the incorporation of fiber reinforcement. The dynamic viscosity number of the solidifiable material is between 100 and 10 000 Pa·s, with the result that corresponding pressures of more than 10 to 100 MPa are required, in particular for obtaining small drop volumes.

Figure 6:
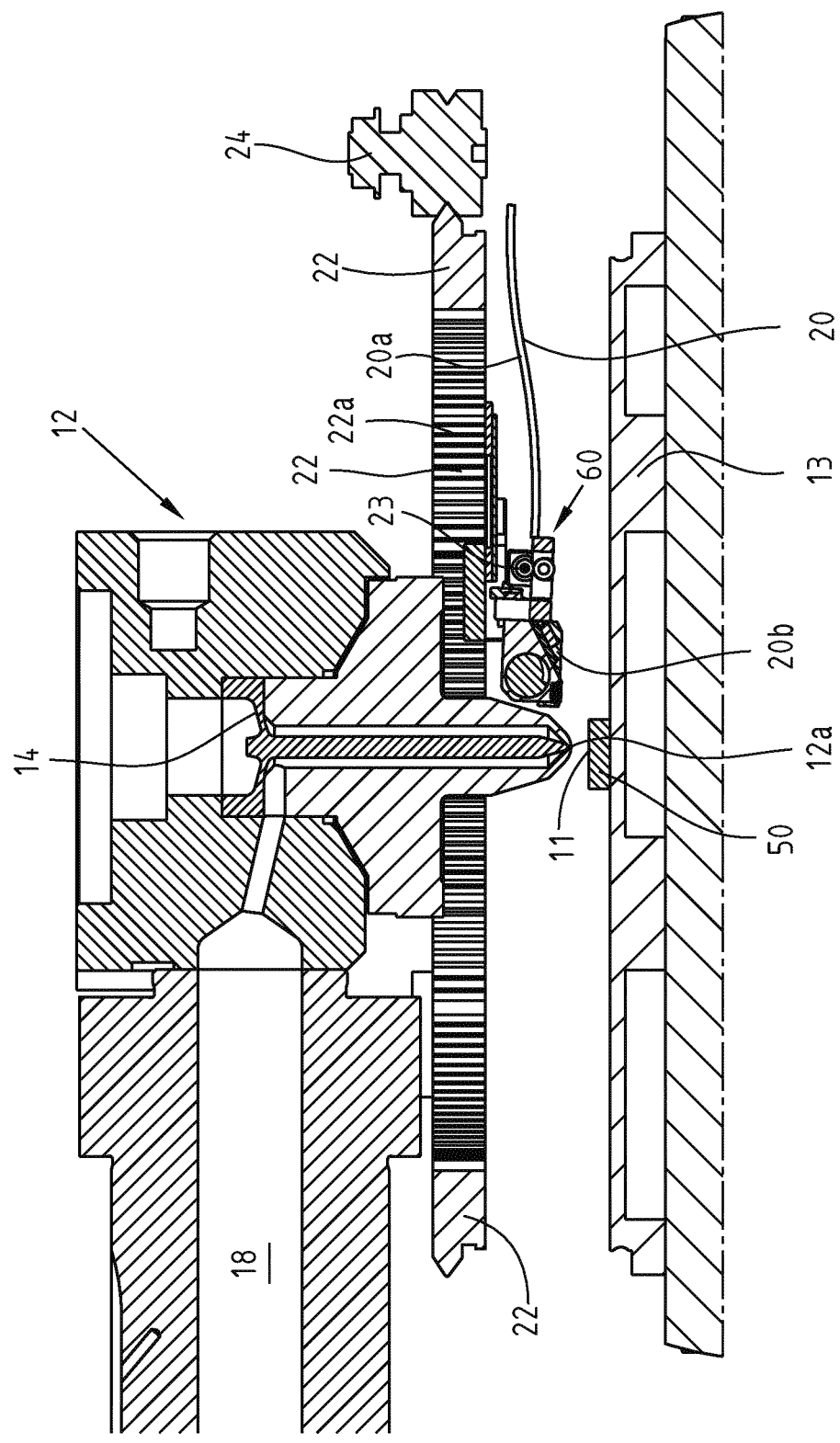
FIG. 6 shows a section through the discharge unit along the line VI-VI in FIG. 3.

According to FIG. 6, the device has a schematically illustrated material reservoir 18 in which the solidifiable material, prepared by a pressure generation unit 16 (FIG. 1a), is in the fluid phase. The solidifiable material is discharged in additive manner from the material reservoir 18 by means of at least one discharge unit 12, in the direction of an object support 13 for the article to be produced. Here, the solidifiable material is applied at a construction point 11 on the object support 13 and/or on the three-dimensional article 50 to be produced. By means of at least one fiber feed device 60, according to FIGS. 2, 3 at least one fiber element 61 is brought to the construction point 11 or deposit position for the purpose of embedding the fiber element in the solidifiable material that is discharged from the discharge unit 12, wherein the fiber feed is at a spacing from the discharge opening 12a for the solidifiable material. Different discharge heads may in this case supply different construction materials and fiber types to the construction location, for the purpose of producing the article 50. As a result it is also possible for example to produce hybrid components, or different fiber orientations may be generated or even almost "woven". Thus, for example, it is conceivable to generate a cross-braiding of fibers in one layer.

The expression "fiber element" here means a fiber to be embedded for the purpose of fiber reinforcement whereof the length is greater than the minimum quantity that the discharge unit 12 can discharge, that is to say greater than the diameter of a drop 70, preferably greater than the diameter of a plurality of drops. The thickness of the fiber element 61 to be embedded, or the fiber strand, is by contrast preferably smaller than or at most equal to the diameter of the drops 70. Possible fiber material is for example glass, carbon, aramid or natural fibers.

Figure 1B:
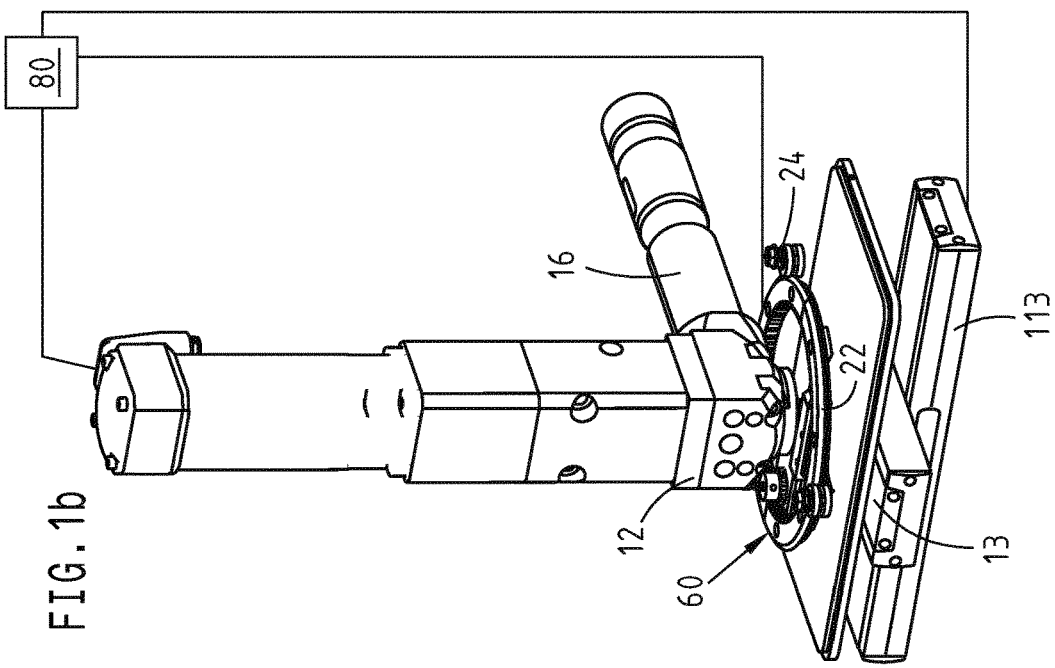
FIGS. 1a, 1b show a three-dimensional view of a device for producing a three-dimensional article, comprising a fiber feed device, with and without a work table.
Figure 1A:
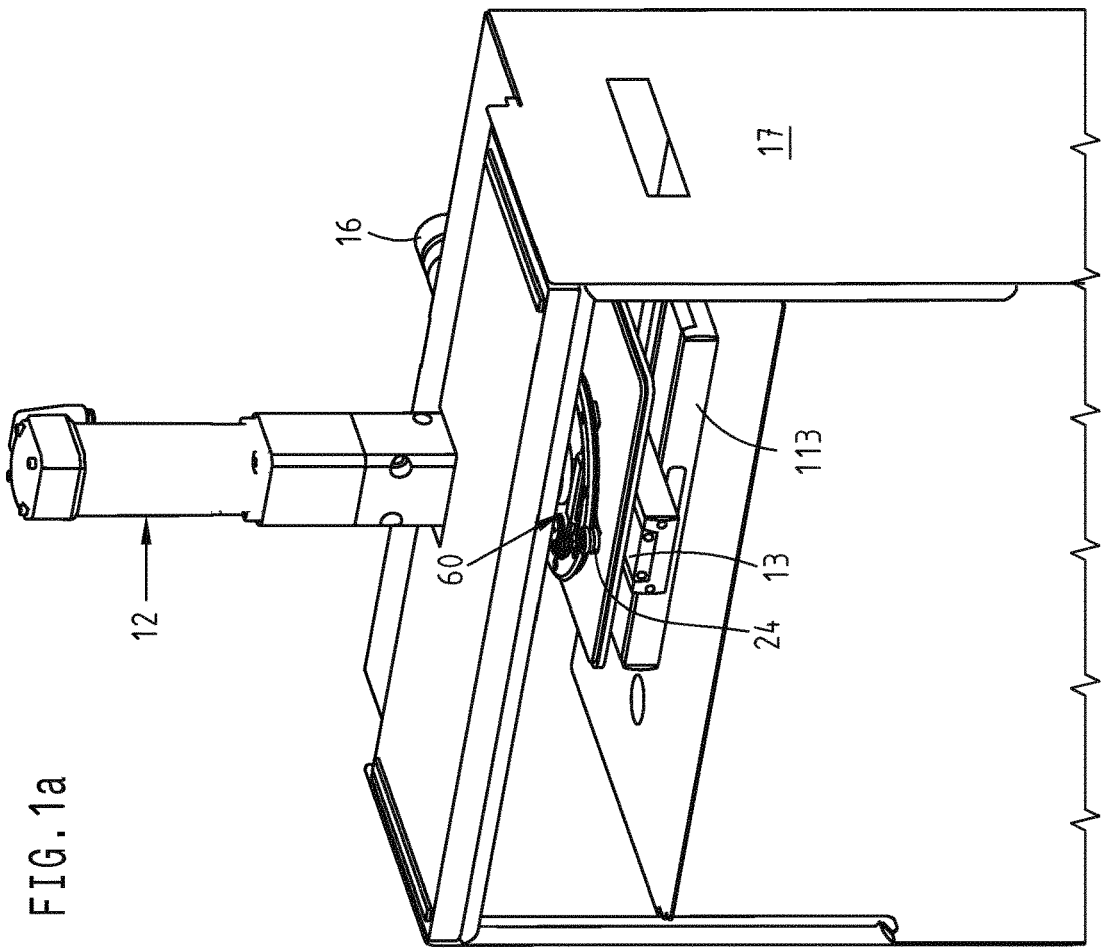

According to FIG. 1b, control means 80 provide for the control of movement of at least one of the elements including the discharge unit 12, the fiber feed device 60 and the object support 13 or the three-dimensional article 50 relative to at least one other of these elements, resulting in a relative movement that allows the article to be constructed. FIG. 1a shows the device arranged on a machine table 17. The article 50 may be made on an arrangement having a multiaxial geometry. A multiaxial geometry of this kind is illustrated in FIGS. 3 and 4 by the x-y-z construction platform 113 on which the object support 13 is located.

Figure 3:
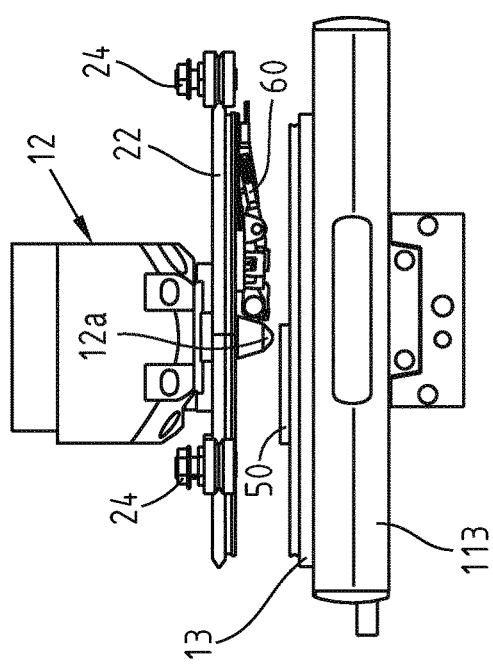
FIG. 3 shows the fiber feed device provided on the discharge unit, with the associated object support, in a view from the front.
Figure 4:
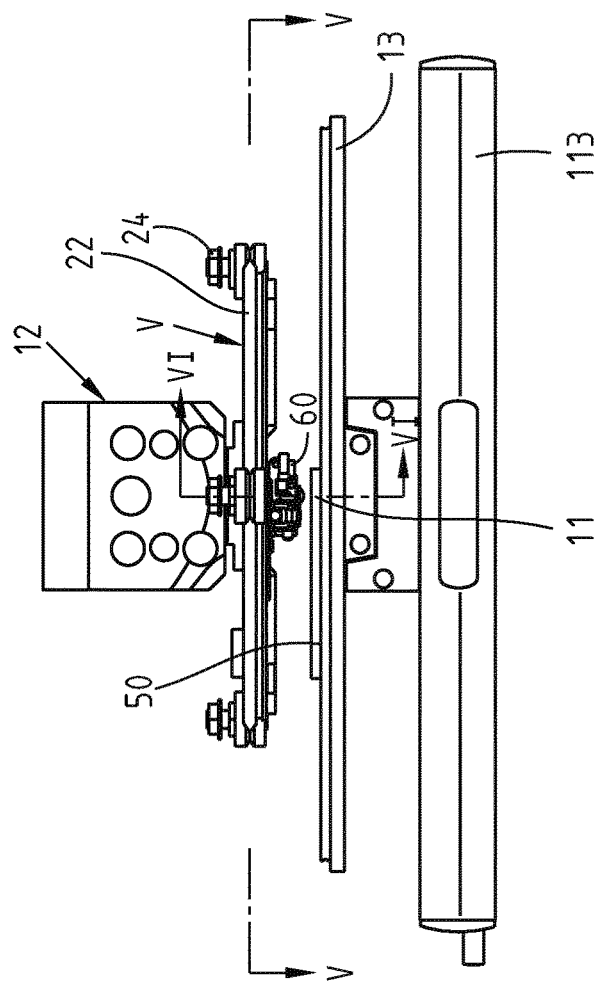
FIG. 4 shows an illustration according to FIG. 3, in a view from the left.

According to FIGS. 3 and 4, the fiber feed device 60 is provided at the discharge opening 12a of the discharge unit 12, which the fiber feed device 60 preferably has a positive guidance arrangement 20 for guiding the fiber element 61 to the deposit position. According to FIG. 7, a cutting device 21 is arranged at the end of the positive guidance arrangement 20. The entire fiber feed device 60 is mounted on the discharge unit 12 and is movable therewith. The fiber element 61 is threaded and fed almost in the manner of an "endless" fiber. In this context, the term "endless" means that the fiber length to be processed is always longer than an individual drop 70 discharged by the device, and where required may also run through the article that is produced. The positive guidance arrangement 20 is formed as a feed/ guidance of the fiber element 61 through a tubular element, preferably a thin capillary tube, to the construction point 11 or deposit position on the object support 13 and/or on the three-dimensional article 50 to be produced. The tubular element 20a serves to put the fiber filament, which lacks rigidity, where it is supposed to be as the fiber element 61. The fiber element 61 may be subsequently pushed up to an end head 20b either by blowing hot air into the tubular element 20a or by way of a micro-feed 23 having conveying rollers.

The fiber feed device 60 is arranged on the discharge unit 12 and is movable for the purpose of orienting the fiber element relative to the progress of constructing the article and relative to the discharge unit. Preferably, the fiber feed device 60 for feeding the at least one fiber element 61 to the construction point 11 is at a spacing from the discharge opening 12a for the solidifiable material, in order to embed the fiber element in the solidifiable material discharged from the discharge unit 12. The fiber feed device 60 is mounted rotatably on the discharge unit 12, and is rotatable by means of a drive unit 30. Illustrated in the Figures here is a fiber feed device 60 that, apart from its rotatability, is fixed and cooperates with an object support 13 that where appropriate also stands on a multiaxial arrangement having for example five axes, as known from DE 10 2011 109 369 A1, with the result that fiber feed is possible not only in two dimensions but also in three dimensions, that is to say that a fiber element may also be guided in space by the three-dimensional article 50 that is being constructed during this. It is likewise conceivable to arrange the fiber feed device 60 or indeed the fiber feed device 60 and the object support 13 respectively on a multiaxial geometry in order to effect a three-dimensional fiber feed. All these possibilities make it possible to achieve a three-dimensional reinforcement of the article 50.

Figure 2:
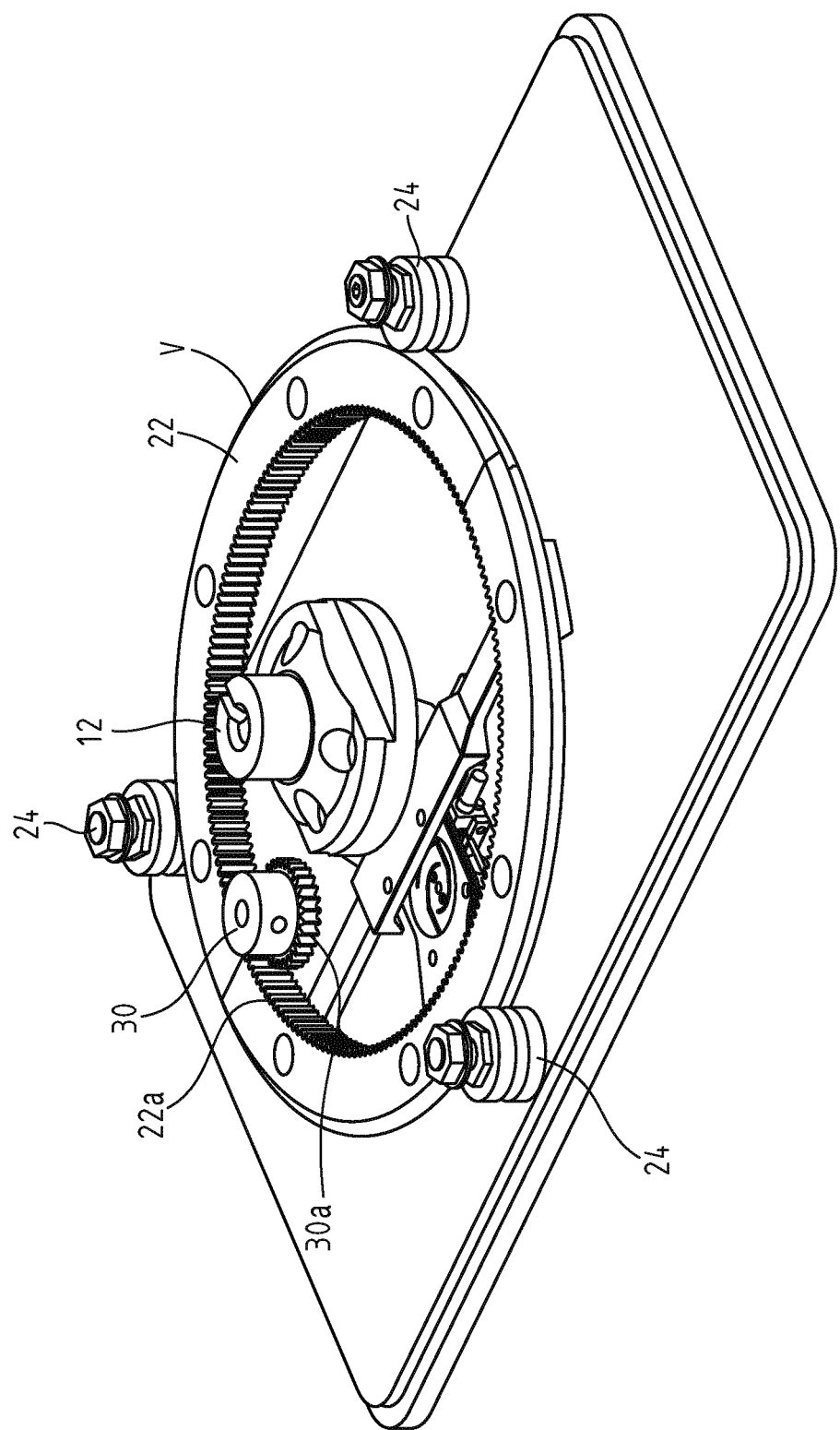
FIG. 2 shows a three-dimensional illustration of an adjustment device for the fiber feed device.

In order to achieve rotatability, the positive guidance arrangement 20 of the fiber feed device 60 and hence also the fiber feed device 60 itself are mounted on the discharge unit 12 by way of a bearing element 22 of an adjustment device V according to FIG. 2. The bearing element 22 is preferably arranged to be concentric with the discharge opening 12a of the discharge unit 12. Driving is performed by way of an output gear 30a of the drive unit 30, which has for example an external toothing that is connected to a toothing 22a of the bearing element 22. The bearing element 22 takes the form of a ring here, with the result that the concentric arrangement can be implemented without difficulty and in a manner saving on space. Alternative drives, for example by way of a friction or belt drive, are likewise conceivable instead of the geared drive. By means of the tubular element 20a the fiber element may be guided on the bearing element 22, and the positive guide arrangement 20 and cutting device 21 can be arranged thereon, as can be seen for example in FIG. 6 or 7. The bearing element 22 is guided on its outside in the bearings 24, which are for their part mounted on a plate 25 secured to the discharge unit 12.

Preferably, the positive guidance arrangement 20 of the fiber feed device 60 is mounted in articulated manner on the discharge unit 12 and is movable by means of a further drive unit 31, which preferably takes the form of a servo drive. Articulated mounting is about the axis 26, according to FIGS. 6 and 7. If the further drive 31 is actuated, an actuation element moves in the slotted guide of the lever 27, with the result that the end head 20b in which the positive guidance arrangement 20 terminates in the region of the discharge opening 12a for the solidifiable material is movable in the manner of a rocker about the axis 26 and, in the event of this actuation, is moved downwards in the direction of the object support 13. As a result, the end head 20b can be moved in the direction towards and away from the object support 13 by means of the further drive unit 31. Using the movability of the end head 20b, the latter can be moved vertically for example in order to secure the fiber element 61 to the substrate at the start or similarly, during the embedding in drops 70, to press the fiber element 61 against the component surface that is being constructed or even against the adjacent "valley" between drops, whereas when the lever 27 is not pivoted out the component can move freely below the feed device.

In addition, a heating element 40 may be provided on or integrated in the end head 20b, with the result that the fiber element 61 is secured by hot melt technology. Similarly, the cutting element 21 is integrated in the end head 20b. This cutting element 21 may be formed by a microcutter that takes the form for example of a magnetically actuated blade in order to be able to sever the fiber at the end of a layer/sheet or indeed to cut it into sections. The entire end head 20b may be oriented freely in the direction of construction. For this purpose, the entire system is connected such that it is vertically fixed to and movable with the discharge unit 12 but is always rotatable in any desired manner in relation to the discharge unit 12. It is also conceivable in principle to provide rotatability about any desired angle, where appropriate also about a multiple of 360°.

By associating the fiber feed device 60 with the discharge opening 12a of the discharge unit 12, the fiber can be successfully embedded in the solidifiable material. Here, it is likewise possible to position the fiber element 61 before the solidifiable material has been discharged, preferably in drops, and then to embed it in the plastics drops. However, it is also possible to embed the fiber directly below the drop 70 or between two drops 70 (see also FIGS. 9a to 9f). The precise manner in which this arrangement is performed is determined primarily by the properties desired for the article 50 to be produced. The fiber element 61 may where required also be impregnated, before it is fed, in a liquid that contributes to the material properties of the article or the production process of the article. For example, this impregnation/sizing may result in the fiber element 61 and the construction material connecting particularly well in order to achieve even better mechanical strength, or may result in contributing to speeding up the production process.

FIG. 7 shows, in a side view, the discharge unit 12 in which the bearing element 22 is secured for the purpose of bearing, primarily, the end head 20b and the tubular element 20a of the positive guidance arrangement 20. Also visible is the contact lever 41 by which the tilting movement and hence also the movement, vertical as seen in the Figure, of the end head 20b is performed by means of the further drive unit 31. The tubular element 20a terminates at the end head 20b. Further visible on the end head are the heating element 40 and the cutting device 21.

The lever 27 and the heating element 40, but also the feeding of hot air through the positive guidance arrangement 20, may also be utilized in order to preheat the fiber element 61 in a targeted manner so that it is better impregnated/connected to the construction material by means of its size. It is also possible to use the lever 27 to press the fiber element 61 on throughout the construction process in order to achieve better adhesion to the already created substrate.

Figure 5:
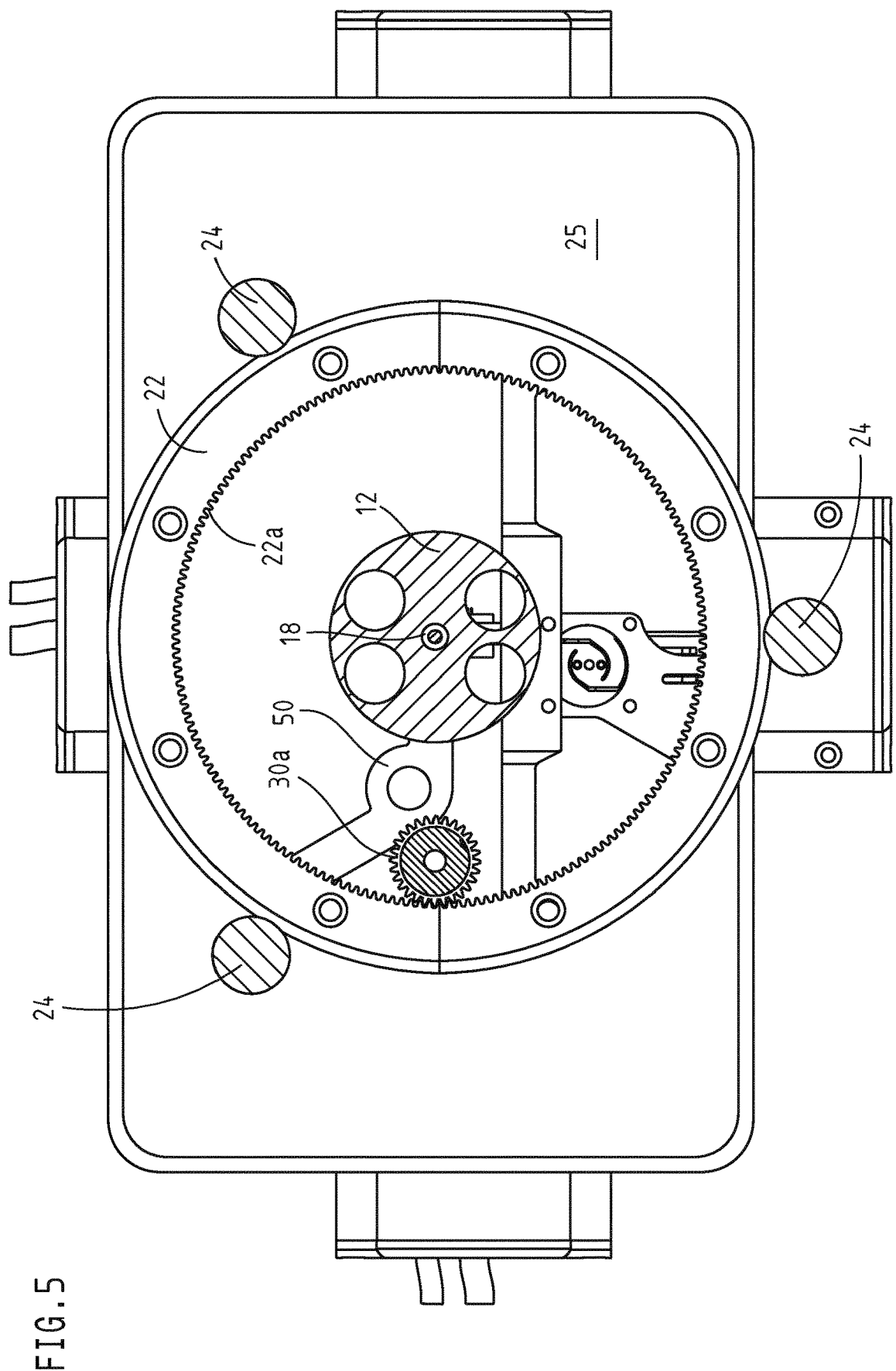
FIG. 5 shows a section through the discharge unit along the line V-V in FIG. 3.

According to the method, the three-dimensional article 50 is produced from at least one fluid-phase solidifiable material that is discharged from at least one discharge opening 12a of at least one discharge unit 12 for the purpose of additive manufacture of the article 50. In order to obtain the desired material properties, by means of at least one fiber feed device 60 at least one fiber element 61 is fed for the purpose of embedding the fiber element in the discharged solidifiable material. Here, the fiber feed device 60 is arranged such that the fiber element 61 can be moved relative to the progress of constructing the article and relative to the discharge unit 12, and can thus be oriented in targeted manner. By way of the adjustment device V, the fiber feed device 60 is rotatable on the discharge unit 12 by means of the drive unit 30 for the purpose of orienting the fiber element. Preferably, the fiber element 61 is fed concentrically to the discharge opening 12a of the discharge unit 12, according to FIG. 5.

By means of a further drive unit 31, the fiber element 61 is movable in the direction towards and away from the object support 13 and/or is pressurable against the article 50 to be produced, which is performed by way of the above-described lever 27. The fiber element 61 is severed at the discharge opening 12a by means of a cutting device 21. By an appropriate advance and follow-on movement of the fiber and severing at the right moment, it is thus possible to ensure that no fiber element projects out of the finished article 50.

The fiber element 61 is conveyed for example by air or by a micro-feed in a positive guidance arrangement 20. The lever 27 and a heating element 40 or hot air in the positive guidance arrangement 20 may also be utilized to preheat the fiber element 61 for example in a targeted manner so that it is better connected to the construction material by means of its finish. It is also possible to use the lever 27 to press on the fiber element 61 throughout the construction process in order to achieve better adhesion to the already created lower layer.

Because the fiber feed device 60 is movable, or rather orientable, independently of the discharge unit 12, it is possible to implement different geometries for embedding the fiber elements 61, according to FIGS. 9a to 9f. According to FIGS. 9a and 9b, which shows a view along the line IXb-IXb in FIG. 9a, the fiber element may be arranged at a gap between the drops 70. In this case, the fiber element 61 may, but need not, also take a meandering line between adjacent rows of drops. According to FIGS. 9c and 9d, which illustrates a view along the line IXd-IXd in FIG. 9c, the fiber element 61 may be inserted directly between adjacent drops 70 such that the drops 70 cling to the fiber element. According to FIG. 9e, the material properties may be further enhanced in that the drops 70 are additionally placed in rows offset from one another as the fiber element 61 is output. In contrast to the embodiment in FIG. 9d, this gives a greater packing density of the drops 70 with the fiber element 61 inserted between the drops. According to FIG. 9f, the fiber element 61 may however also be embedded in the drops 70 of the solidifiable material that are discharged from the discharge unit 12.

It is self-evident that this description may be subject to the most diverse modifications, changes and adaptations which are within the range of equivalents to the attached claims.

The invention claimed is:

1. A device for producing a three-dimensional article made from a fluid-phase solidifiable material, the device comprising:
    a discharge opening configured to allow additive discharge of the solidifiable material for constructing the three-dimensional article,
    a fiber feed device configured to feed a fiber element and to embed the fiber element in the solidifiable material that is discharged from the discharge opening,
    wherein the fiber feed device is movable in relation to a progress of the constructing of the three-dimensional article and configured to orient the fiber element in the solidifiable material,
    wherein the fiber feed device is mounted adjacent to the discharge opening and is movable relative to the discharge opening,
    wherein the fiber feed device is mounted rotationally movable relative to the device and is rotatable around and relative to the discharge opening by a drive unit, and
    wherein the device comprises a discharge unit comprising the discharge opening, the fiber feed device being mounted on the discharge unit in an articulated manner and is movable relative to the discharge unit in a direction toward and away from an object support.

2. A device according to claim 1, wherein, the fiber feed device is spaced from the discharge opening.

3. A device according to claim 1, wherein the fiber feed device is mounted adjacent to the discharge opening by a bearing of an adjustment device, wherein the bearing is arranged concentric with the discharge opening.

4. A device according to claim 3, wherein the bearing comprises a ring having a drive gear which is in operative connection with an output gear of the drive unit.

5. A device according to claim 1, wherein the fiber feed device comprises a forced guide configured to guide the fiber element to a construction point and a cutter arranged at an end of the forced guide.

6. A device according to claim 5, wherein the forced guide has a tubular element configured to feed the fiber element, wherein the fiber element is conveyable in the tubular element by air or a micro-feed.

7. A device according to claim 5, wherein an end head of the forced guide includes a heating element.

8. A device according to claim 7, wherein the cutter is integrated in the end head.

9. A device according to claim 1, wherein the solidifiable material is in the form of discontinuous drops.

10. A device according to claim 1, wherein the solidifiable material is in the form of a strand.

11. A method for producing a three-dimensional article made from at least one fluid-phase solidifiable material using the device of claim 1, wherein at least one solidifiable material is discharged from at least one discharge opening of at least one discharge unit for additive manufacturing of the three-dimensional article, and by means of at least one fiber feed device mounted on the at least one discharge unit at least one fiber element is fed for embedding the at least one fiber element in the at least one solidifiable material being discharged and is oriented in relation to a progress of constructing the three-dimensional article and is moved with the at least one discharge unit and in relation to the at least one discharge unit, wherein for orienting the at least one fiber element the at least one fiber feed device is rotated around the at least one discharge unit on the at least one discharge unit by means of a drive unit.

12. A method according to claim 11, wherein the at least one fiber element is fed by the at least one fiber feed device, which is arranged to be concentric with the at least one discharge opening of the at least one discharge unit.

13. A method according to claim 11, wherein the at least one fiber element is movable in a direction towards and away from an object support.

14. A method according to claim 11, wherein the at least one fiber element is pressable against the three-dimensional article to be produced by means of a further drive unit.

15. A method according to claim 11, wherein the at least one fiber element is severable at the at least one discharge opening by means of a cutting device.

16. A method according to claim 11, wherein the at least one fiber element is conveyed by means of air or a microfeed in a positive guidance arrangement.

17. A method according to claim 11, wherein the at least one fiber element is embedded in drops of the at least one solidifiable material, which drops are discharged from the discharge unit, or is inserted between adjacent drops.

* * * * *